US012625477B2

(12) United States Patent (10) Patent No.: US 12,625,477 B2

Wang et al. (45) Date of Patent: May 12, 2026

(54) MOTION DETECTION METHOD FOR MANAGING RUGGED PLATFORM CONFIGURATIONS

(71) Applicant: Dell Products L.P., Round Rock, TX (US)

(72) Inventors: Kai Wang, Shanghai (CN); Zheng Xing, Shanghai (CN); Balasubramanian Narayanan, Georgetown, TX (US); Wan Qing Zheng, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 453 days.

(21) Appl. No.: 18/171,174

(22) Filed: Feb. 17, 2023

(65) Prior Publication Data

US 2024/0280947 A1 Aug. 22, 2024

(51) Int. Cl.
*G05B 13/02* (2006.01)
*G01C 21/28* (2006.01)

(52) U.S. Cl.
CPC ......... *G05B 13/0265* (2013.01); *G01C 21/28* (2013.01)

(58) Field of Classification Search
CPC ............................ G05B 13/0265; G01C 21/28

USPC ......................................................... 701/36
See application file for complete search history.

(56) References Cited

U.S. PATENT DOCUMENTS 5,991,692 A * 11/1999 Spencer, II ............. G01P 21/02
701/472
11,339,927 B2 * 5/2022 Chemel ................... F21V 21/15

* cited by examiner

*Primary Examiner* — Todd Melton
*Assistant Examiner* — Vincent Feng
(74) *Attorney, Agent, or Firm* — Jackson Walker L.L.P.

(57) ABSTRACT

Disclosed methods and systems for dynamically configuring an information handling system may employ or perform operations including receiving motion data from a plurality of system sensors including at least a global positioning system (GPS) receiver and an accelerometer and repeatedly, e.g., every five seconds, identifying a current motion state of the system in real time based on the motion data. The current motion state may be selected from a group of motion states that may include a moving vehicle (MV) motion state, indicating the system is located within a moving vehicle, and a stationary motion state, indicating the system is stationary or substantially stationary. A configuration of the system may then be tuned in accordance with the current motion state. Tuning the system configuration may include configuring the system in accordance with a safe driving configuration responsive to identifying the MV motion state as the current motion state.

16 Claims, 6 Drawing Sheets

100

100

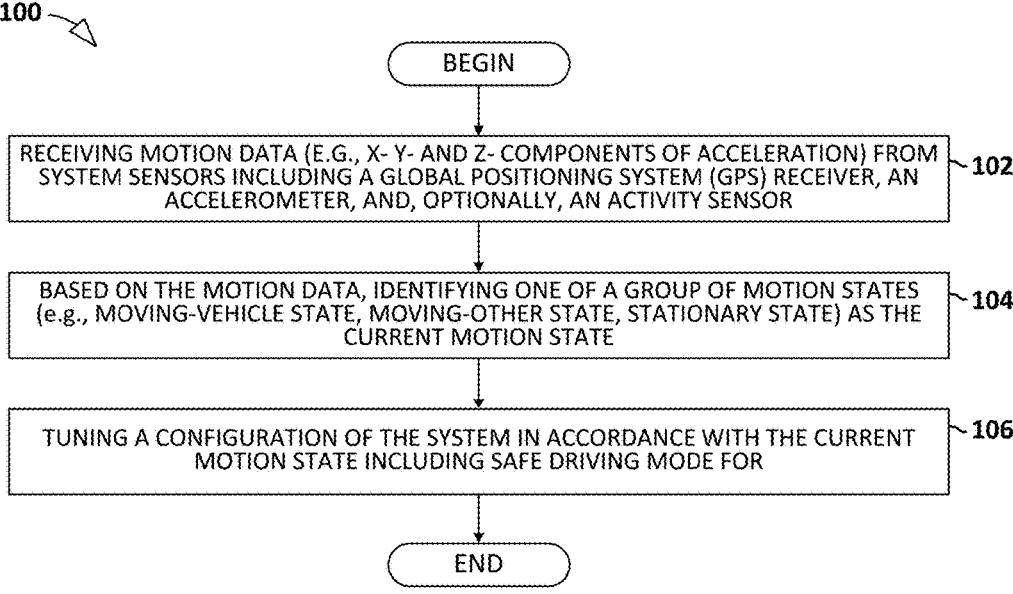

BEGIN

RECEIVING MOTION DATA (E.G., X- Y- AND Z- COMPONENTS OF ACCELERATION) FROM SYSTEM SENSORS INCLUDING A GLOBAL POSITIONING SYSTEM (GPS) RECEIVER, AN ACCELEROMETER, AND, OPTIONALLY, AN ACTIVITY SENSOR ～102

BASED ON THE MOTION DATA, IDENTIFYING ONE OF A GROUP OF MOTION STATES (e.g., MOVING-VEHICLE STATE, MOVING-OTHER STATE, STATIONARY STATE) AS THE CURRENT MOTION STATE ～104

TUNING A CONFIGURATION OF THE SYSTEM IN ACCORDANCE WITH THE CURRENT MOTION STATE INCLUDING SAFE DRIVING MODE FOR ～106

END

FIG. 1

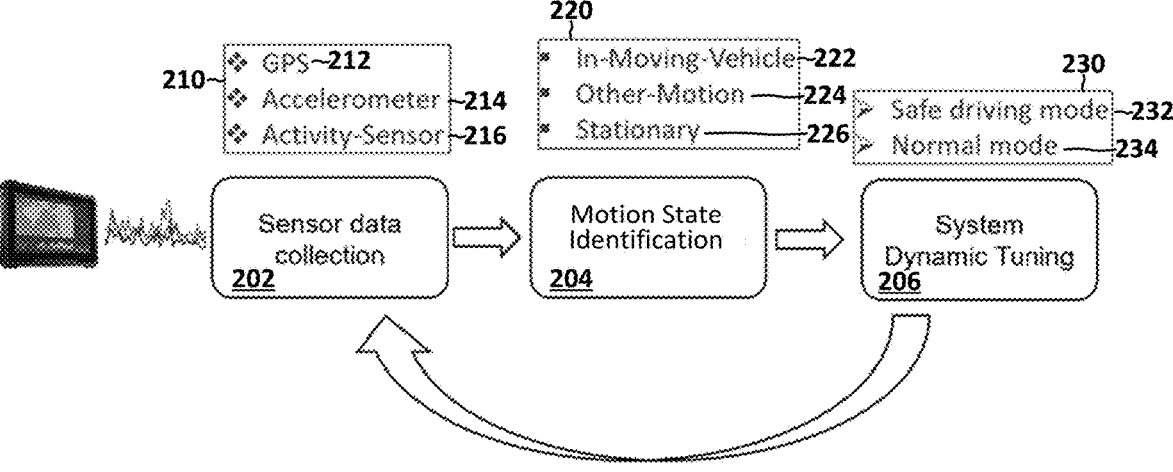

| Motion state | Criteria |
|---|---|
| Stationary motion state | var-x var-y var-z  substantially equal to 0 |
| MV motion state | non-zero var-x var-y var-z within specified range |
| MO motion state | non-zero var-x var-y var-z exceeding specified range |

900

MOTION DETECTION METHOD FOR MANAGING RUGGED PLATFORM CONFIGURATIONS

TECHNICAL FIELD

Disclosed subject matter is in the field of rugged systems and, more particularly, configuration and management of rugged systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Disclosed methods and systems for dynamically configuring an information handling system may employ or perform operations including receiving motion data from a plurality of system sensors including at least a global positioning system (GPS) receiver and an accelerometer and repeatedly, e.g., every five seconds, identifying a current motion state of the system in real time based on the motion data. The current motion state may be selected from a group of motion states that may include a moving vehicle (MV) motion state, indicating the system is located within a moving vehicle, and a stationary motion state, indicating the system is stationary or substantially stationary. A configuration of the system may then be tuned in accordance with the current motion state. Tuning the system configuration may include configuring the system in accordance with a safe driving configuration responsive to identifying the MV motion state as the current motion state. The safe driving configuration may include, for example, a fully dimmed or partially dimmed display and an automatically enabled voice control feature. Configuration tuning may further include configuring the system in accordance with an original, normal, or full-function configuration responsive to identifying the stationary motion state as the current motion state, wherein the normal configuration includes, at least, an undimmed display and an enabled voice control feature.

Identifying the current motion state may include determining a GPS suitability, which indicates whether utilizing GPS data to determine the current motion state is consistent with one or more GPS suitability criteria such as GPS signal strength and GPS power consumption. If GPS suitability is positive, the motion state may be determined based on the GPS data. Conversely, if the GPS suitability is negative, e.g., poor signal strength or low available power supply, the current motion state may be determined based on non-GPS data, including accelerometer data, activity sensor data, etc. Determining the current motion state based on data other than GPS data may include invoking a motion state algorithm trained to identify motion states based on acceleration parameters derived from motion data received from the accelerometer. The accelerometer parameters may include x, y, and z components of a mean acceleration parameter, x, y, and z components of an acceleration variance parameter; and a standard deviation parameter corresponding to a standard deviation of the x, y, and z components of the acceleration variance parameters. The MV motion state may be identified as the current motion state based, at least in part, on the x, y, and z components of the variance parameter being within a predetermined range, i.e., non-zero variance with a magnitude less than or equal to a specified threshold.

In addition to the MV and stationary motion states, the group of recognized motion states may include an other-motion (OM) state indicating system motion not associated with a moving vehicle. In such embodiments, tuning the configuration of the system may include maintaining a current configuration of the system responsive to identifying the other-motion state as the current motion state.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a flow diagram of a motion-based method for dynamically tuning the configuration of an information handling system in accordance with disclosed teachings;

FIG. 2 illustrates an implementation of the dynamic tuning method of FIG. 1;

DETAILED DESCRIPTION

Figure 3:
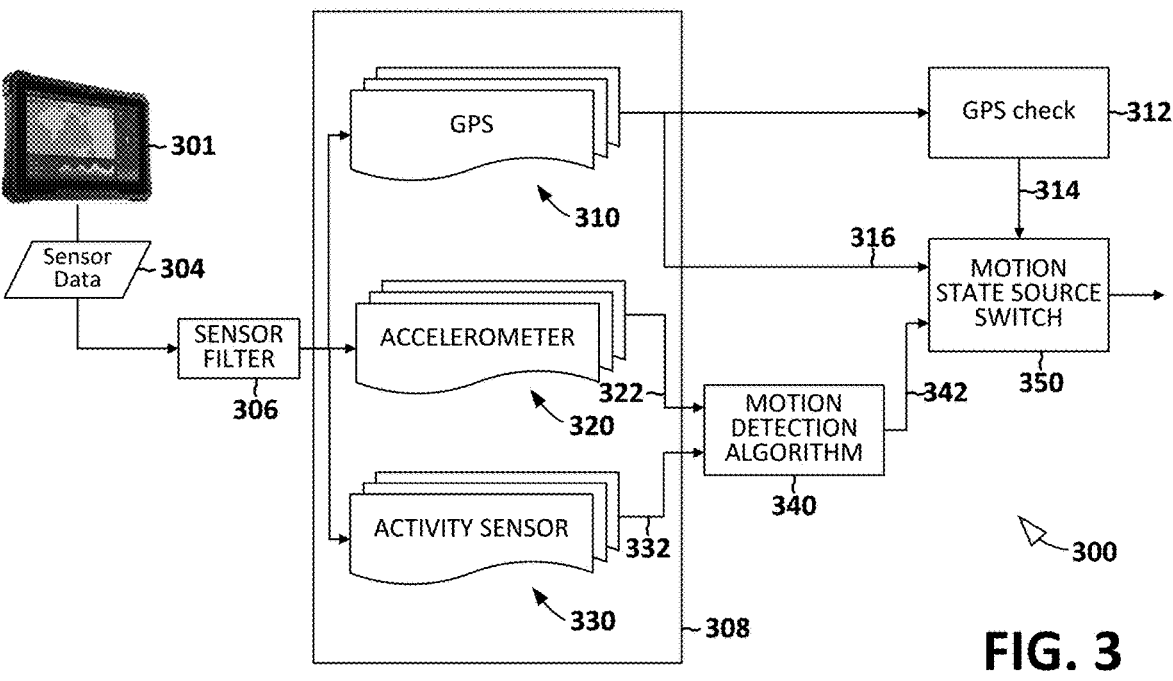
FIG. 3 illustrates an exemplary motion detection module for identifying motion states.

Exemplary embodiments and their advantages are best understood by reference to FIGS. 1-9, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM) , and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a flow diagram of a method 100 for dynamically tuning the configuration of an information handling system based on sensor data acquired and reported by one or more system sensors. In at least one embodiment, the information handling system is a rugged notebook, tablet, or other type of mobile system suitable for use in harsh operating environments including, as non-limiting examples, physically unstable environments characterized by frequent and significant vibrations and/or changes in position, velocity, and/or acceleration, temperature extremes, humid and/or wet environments, and so forth. Rugged systems may be beneficially deployed in a wide variety of applications including, without limitation, public safety/first responder, military, construction, distribution/delivery, field service, manufacturing, agriculture, and so forth. In at least some embodiments, rugged systems include systems that comply with U.S. Department of Defense (DOD) MIL-STD-810, Test Method Standard, Environmental Engineering Considerations, and Laboratory Tests.

As depicted in FIG. 1, method 100 may be performed by a system that supports dynamic, motion-based configuration tuning. The elements of the illustrated method 100 may correspond to software instructions stored in a memory resource of the system and executed by a central processing unit (CPU), a management resource processor, an embedded controller, or another suitable type of processor. Method 100 may be performed as a background process or as an application executing within an operating system environment. As depicted in FIG. 1, method 100 may be performed iteratively or repeatedly such that configuration tuning of the system is performed continuously in real time.

The illustrated method begins with the receiving (operation 102) of sensor data from any one or more of a plurality of system sensors. The systems sensors may include, as non-limiting examples, a global positioning system (GPS) receiver, an accelerometer, and an activity sensor, which may be implemented as an optical or other type of sensor for detecting movement or another activity or feature of a user or another external object. The sensor data received from one or more of the sensors may include motion data indicative of a position, velocity, and/or acceleration of the system. The motion data may include x, y, and z components of an acceleration parameter generated by the accelerometer. In an exemplary embodiment, the accelerometer may generate 50 samples of the acceleration parameter per second and buffer the sample data in a buffer that is refreshed every five seconds (0.2 Hz). It will be understood, however, that the other embodiments may employ different sampling and/or refresh rates.

The method 100 illustrated in FIG. 1 identifies (operation 104) a motion state for the information handling system based on the motion data received from the various sensors. Method 100 may support a pre-defined set or group of recognized motion states. In at least some embodiments, the set of recognized motion states includes a desirably small number of recognized motion states to improve the efficiency of the state identification process. As an example, the number of recognized motion states may be less than or equal to five or less in some embodiments. At least one exemplary embodiment, illustrated in FIG. 2 described below, supports just three recognized motion states, including a moving vehicle (MV) motion state, a stationary motion state, and a moving-other (MO) motion state. As suggested by their designations, the MV state indicates a system located within a motorized vehicle that is currently moving, the stationary motion indicates a system that is static or substantially static, and the MO motion states indicates a system that is moving within or outside of a vehicle that is not moving. Examples of a system in the MO motion state may include a system that is being moved to or from a mounting support within a vehicle.

The method 100 illustrated in FIG. 1 continues by tuning (operation 106) a configuration of the system in accordance with the most recently determined motion state, referred to herein simply as the current motion state. As an illustrative example of this configuration tuning, method 100 may configure a system in accordance with a safe driving configuration responsive to identifying the MV motion state as the current motion state. In this example, the safe driving configuration may include any one or more configuration settings that may negatively influence the vehicle driver's ability to navigate the vehicle safely and efficiently. Accordingly, the safe driving configuration may include a fully dimmed or partially dimmed display screen, reduced audio output, automatic enablement of a voice control feature, and the like. Conversely, configuration tuning may include configuring a system in accordance with a stationary configuration responsive to identifying the stationary motion state as the current motion state. In this example, the stationary configuration may correspond to a configuration in which one or more configuration settings modified to achieve the previously described safe driving configuration are restored to a previous value. Thus, for example, if a dimmed display screen is associated with the safe driving configuration, the stationary configuration may restore a display screen illumination setting to its previous value when the system is subsequently identified as being in the stationary motion state. In this respect, the stationary configuration may correspond to an initial or normal configuration emphasizing full functionality of the system. It will again be appreciated by those of ordinary skill in the field that the configuration settings specifically mentioned in the preceding description are exemplary and that other implementations may use more, fewer, and/or a different set of configuration parameters. Expanding to three motion states including the OM motion state, an exemplary implementation may configure the system in a safe driving mode whenever the MV motion state is active, restore the system to a normal configuration when the stationary motion state is active, and leave the configuration unchanged when an OM motion state is active.

FIG. 2 is a graphical depiction of an exemplary implementation of the method 100 illustrated in FIG. 1. As depicted in FIG. 2, the illustrated implementation includes a continuously looping sequence of operations 202, 204, and 206, each of which is implemented with specifically identified features. The implementation illustrated in FIG. 2 includes a sensor data collection operation 202 that collects data generated by sensor resources 210. The sensor resources 210 illustrated in FIG. 2 include a GPS receiver 212, an accelerometer 214, and an activity sensor 216. A motion state identification operation 204 receives sensor data from sensor resources 210 and identifies a current motion state selected from the group of recognized motion states 220. The recognized motion states depicted in FIG. 2 include an MV motion state 222, an MO state 224, and a stationary motion 226. The depicted implementation then performs operation 206 to dynamically tune the system configuration, in accordance with the motion state identified in operation 204, by configuring the system to reflect a configuration appropriate for the motion state. The implementation depicted in FIG. 2 supports a pair of configurations 230 including a safe driving configuration 232 and a normal configuration 234 as described in more detail below.

In at least some embodiments, a rugged control center stealth mode may be employed as the safe driving mode corresponding to the MV motion state. Stealth beneficially supports quick turn off of displays, light, wireless, radios, etc. Safe driving mode may include a voice control function etc. that enables voice commands and reads incoming messages aloud. A speed alter feature of the safe driving mode may warn the driver when the current speed exceeds a specified threshold. The safe driving mode may further support adaptive performance features that turn off display screens to save battery power and reduce potentially distracting glare for the driver. Safe driving mode may further include power limit reductions for improved efficiency, recognizing that the system is unlikely to be used during an MV motion state. Similarly, external noise may be reduced via maximum fan speed reductions during safe driving mode.

FIG. 3 illustrates exemplary information handling resources 300 suitable for use in conjunction with the configuration tuning method 100 illustrated in FIG. 1. The information handling resources 300 illustrated in FIG. 3 include a system 301, such as a rugged laptop, tablet, notebook, or other type of information handling system including one or more sensors, not explicitly depicted in FIG. 3, generating sensor data 304 that is passed through one or more sensor filters 306 before being stored to a storage buffer 308. In at least some embodiments, the sensors may generate sensor data substantially continuously and the buffer resources are refreshed from time to time, e.g., every 5 seconds, every 10 seconds, etc.

As depicted in FIG. 3, the sensor data 304 includes GPS data 310 generated by a GPS device, accelerometer data 320 generated by an accelerometer, and activity sensor data 330 generated by an activity sensor. In at least one embodiment, system 301 includes at least a GPS sensor that generates GPS data 310, an accelerometer that generates accelerometer data 320, and an activity sensor that generates activity data 330.

The depicted resources 300 beneficially support independent and alternative resources and methods for monitoring the motion state of system 301 in real time. The depicted resources 300 support GPS motion state determinations based on GPS data 310 or, alternatively, non-GPS data. Non-GPS data may include, as is true in FIG. 3, accelerometer data 320 and activity sensor data 330. The illustrated resources further include a GPS check module 312 that provides a selection input 314 to a motion state source switch 350. Motion state source switch 350 is configured to receive a GPS-based signal 316, indicating current motion state information, from GPS data 310. Motion state support switch 350 also receives a non-GPS based signal 342, also indicating current motion state information, from a motion detection algorithm module 340.

GPS check module 312 may be configured to check one or more conditions or criteria for using GPS data 310 to determine the current motion state. In at least one embodiment, GPS check module 312 is configured to check at least a GPS signal strength and a GPS power criteria. The GPS signal strength criteria enables the system to switch to non-GPS motion state determination when the GPS signal is not sufficiently strong or clear. It is well known that GPS signals are vulnerable in closed or covered environments including, as examples, within buildings, tunnels, underground parking garages, and the like. When GPS signal strength drops below a minimum specified value, GPS check module 312 may disable GPS-based motion state determinations and enable non-GPS motion state determinations. In addition, GPS check module 312 may be configured to check the status of a GPS power condition. It is well known that GPS receivers draw significant and substantially continuous power that can quickly deplete the power supply, i.e., battery, of a mobile system. The depicted embodiment supports, as an illustrative example, disabling GPS-based motion state determinations when a system's battery is providing primary power to the system and/or the stored charge in the battery is at or below some threshold minimum value.

The motion detection algorithm 340 of FIG. 3 may be used to identify a system's current motion state whenever GPS-based motion state determinations are disabled, whether for poor signal strength, inadequate power reserves, or another reason. The illustrated motion detection algorithm 340 receives accelerometer data 322 as well as activity sensor data 332. Motion detection algorithm 340 may be implemented as a cloud based machine learning algorithm described in more detail below.

Figure 4:
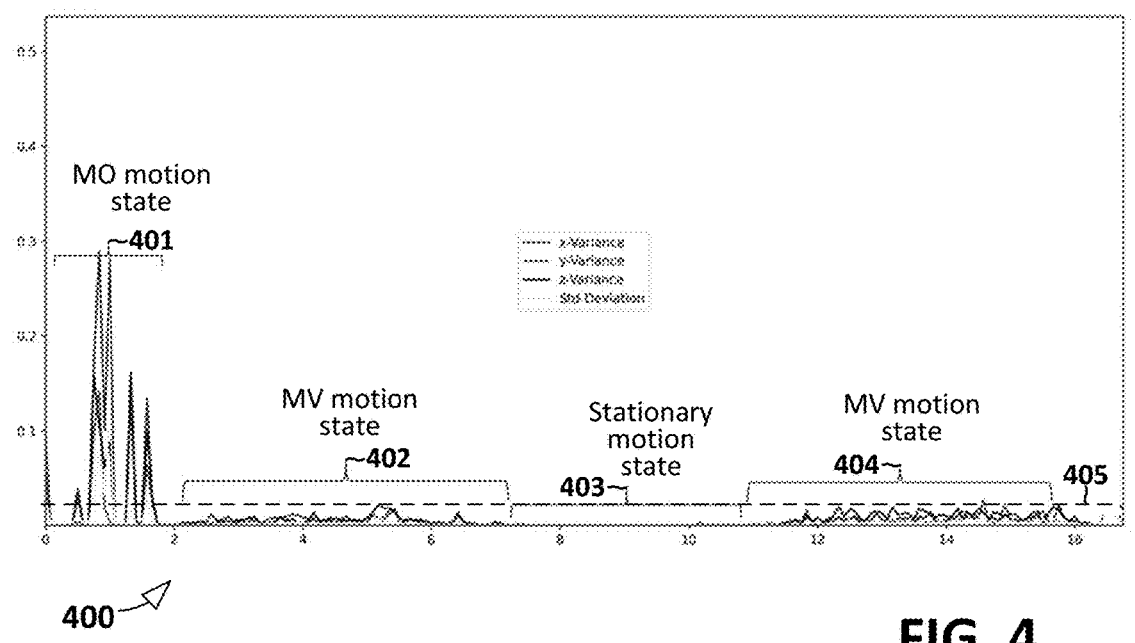
FIG. 4 illustrates a time plot of exemplary acceleration data generated by a rugged system.

FIG. 4 illustrates a time plot 400 of exemplary x-axis, y-axis, and z-axis components of acceleration data and, more specifically, acceleration variance and standard deviation data derived from instantaneous acceleration values generated by an accelerometer of a rugged system over an interval of time encompassing four visually distinguishable sub-intervals 401 through 404, each of which corresponds to a single motion state of the system. Those of ordinary skill in the field will appreciate that the four sub-intervals 401 through 404 depicted in FIG. 4 exhibit three distinct data patterns.

Sub-interval 403, which exhibits a substantially static data pattern wherein the acceleration variance and standard deviation are 0 or substantially 0, corresponds to a stationary motion state. Sub-intervals 402 and 404, which exhibit a data pattern wherein the acceleration variance and standard deviation is non-zero and the magnitude of the acceleration variance is largely or entirely less than or equal to a threshold variance 405, correspond to an MV motion state. Sub-interval 401, which exhibits non-zero variance having a magnitude generally and/or frequently exceeding the threshold value associated with the MV motion state, corresponds to an MO motion state.

Figure 5:
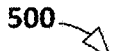
FIG. 5 illustrates a motion state table capturing the data pattern characteristics of each motion state.

The time plot 401 provides visual motivation for a motion state identification algorithm that employs acceleration statistics, including but not strictly limited to acceleration variance statistics, for identifying three significant motion states associated with a rugged system deployed in a rugged environment. Referring now to FIG. 5, the motion states illustrated in FIG. 4 and their respective data pattern characteristics are represented in a table 500 in which each motion state is associated with a corresponding data pattern criterion.

Figure 6:
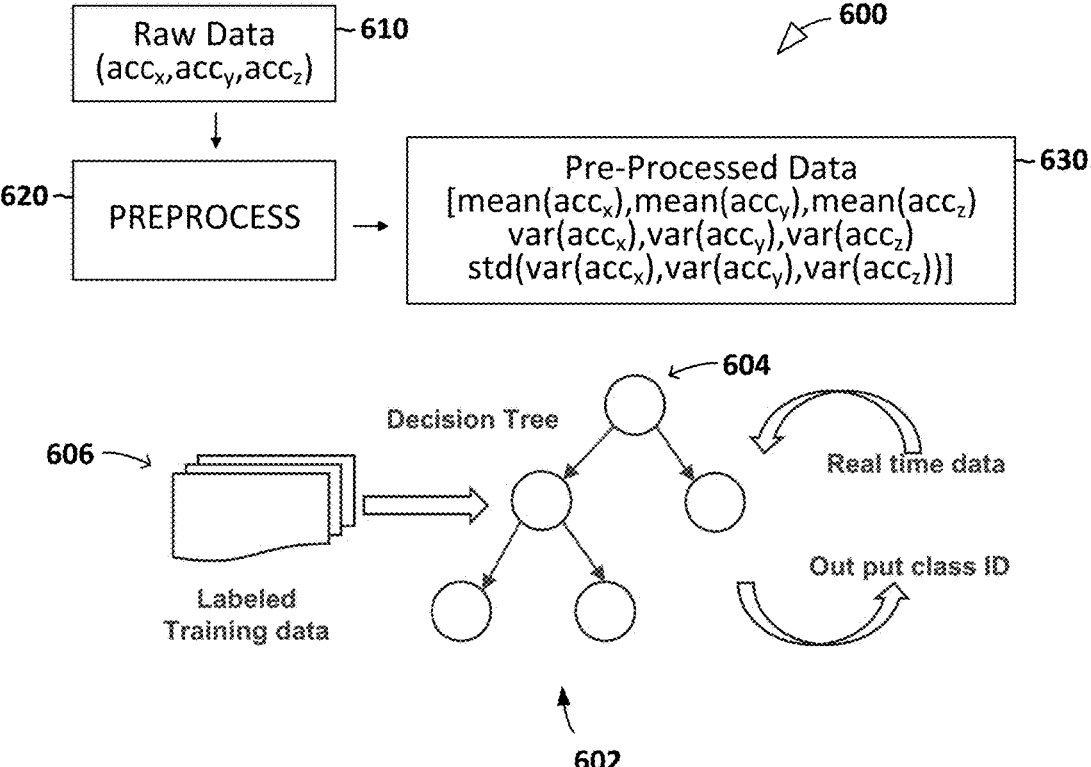
FIG. 6 illustrates a motion determination resource employing a machine learning algorithm including a decision tree trained with labeled training data.

FIG. 6 illustrates a motion determination resource 600 suitable for use in conjunction with the configuration tuning method 100 of FIG. 1. The illustrated motion determination resource 600 employs a machine learning (ML) module 602 including a decision tree 604 trained in accordance with labeled training data 606.

As depicted in FIG. 6, raw data 610 received from an accelerometer includes x, y, and z components of instantaneous acceleration values. The accelerometer may generate sample acceleration values at a predetermined frequency, e.g., 50 Hz, or another suitable frequency. The sampled values may be buffered or otherwise stored as a data set, which may be refreshed at predetermined intervals, e.g., 5 second intervals.

The pre-processing module 620 of FIG. 6 generates preprocessed data 630 by deriving acceleration statistics from the sampled values. The pre-processed data 630 illustrated in FIG. 6 includes x, y, and z components of: a mean acceleration parameter, an acceleration variance parameter, and a standard deviation parameter calculated as the standard deviation of the x, y, and z components of the acceleration variance. The standard deviation parameter may be suitable for use to distinguish, for example, between an MV motion state and an MO motion state.

In at least some embodiments, the standard deviation data may be used to distinguish between an MV motion state and an MO state. Although acceleration data for MV and MO states are easily distinguishable when the MV motion state data is generated from a vehicle traveling in a generally straight line, MV motion state data may blur with MO motion state data when a vehicle is turning corners or performing similar operations. When such a situation is presented, the standard deviation data may be used to more clearly distinguish between the two states. Pre-processed data 630 may then be provided to ML module 602 to identify the most likely motion state corresponding to the applicable information.

Figure 7:
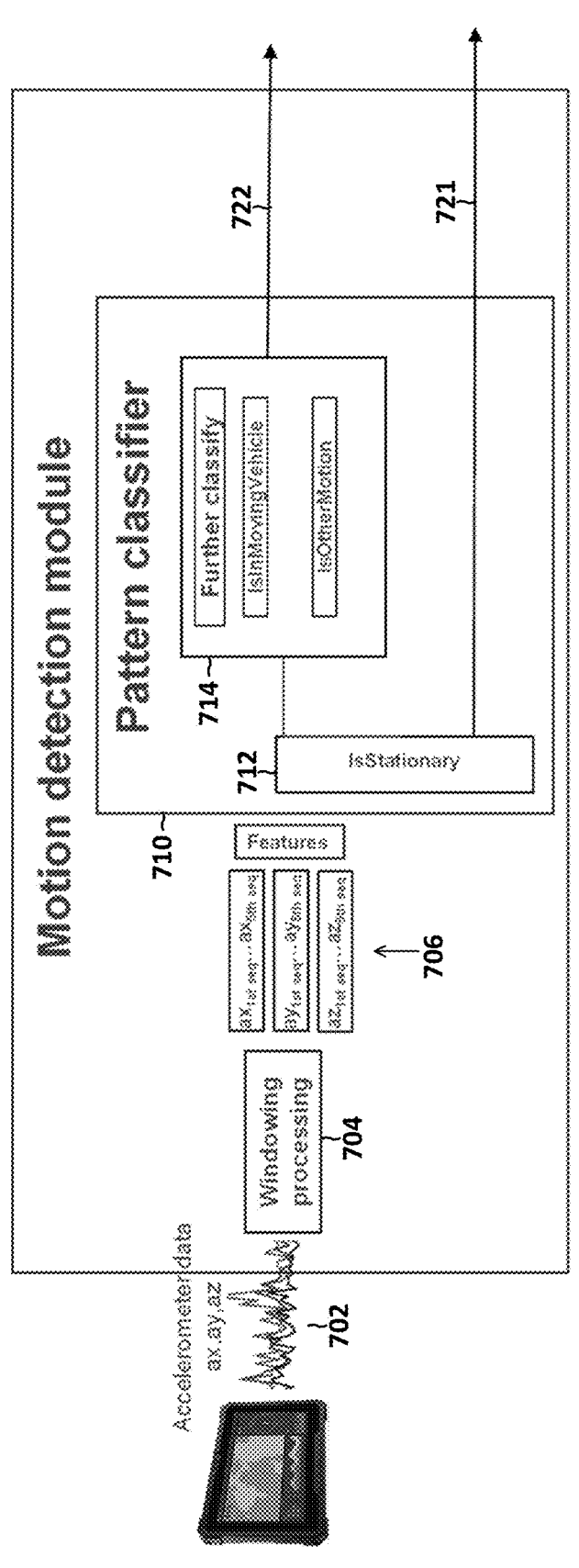
FIG. 7 illustrates an exemplary pattern classifier for training a motion state identification algorithm.

FIG. 7 illustrates exemplary elements for training a motion detection module 700 to identify motion states in real time. As depicted in FIG. 7, a windowing processor 704 processes raw data 702 to generate x, y, and z, sequence data 706, which is provided to a pattern classifier 710. Pattern classifier 710 may include a first node 712 to trivially recognize stationary state data. Non-stationary state data may then be further processed in one or more nodes 714 to distinguish MV motion state data from MO motion state data. In this embodiment, pattern classifier 710 may generate a first output 721 indicating an identification of the stationary motion state, and a second output 722 indicating whether non stationary state data corresponds to an MV motion state or an OM motion state.

Figure 8:
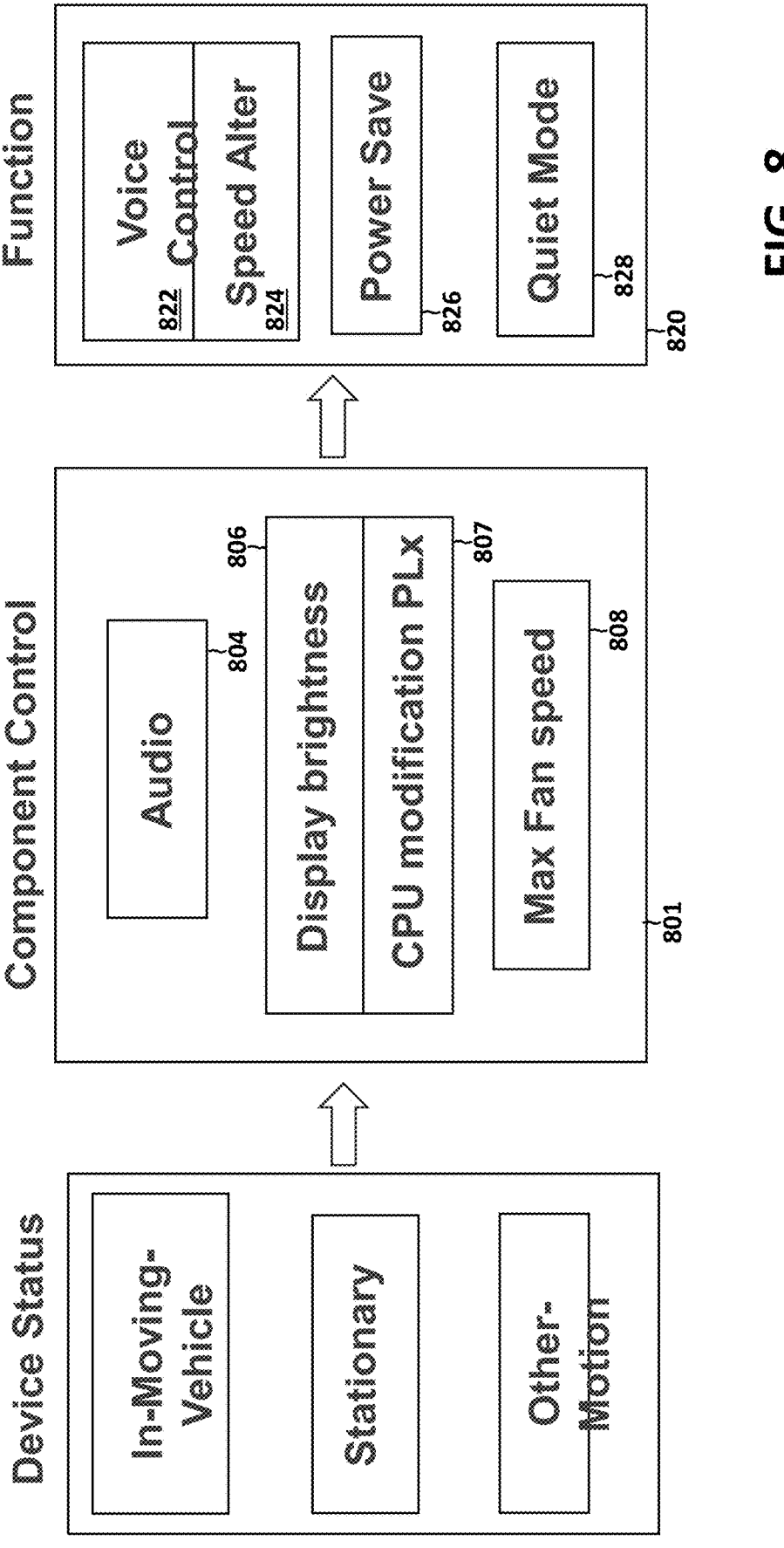
FIG. 8 illustrates exemplary configuration tuning features of disclosed methods and systems.

FIG. 8 illustrates configuration tuning features of disclosed methods and systems for motion-based dynamic tuning of rugged systems. As depicted in FIG. 8, the motion state of the system is associated with a set of component control features 801 and a set of configuration functions 820. The component control features illustrated in FIG. 8 include an audio component 804, a display brightness feature 806, a CPU modification feature 807, and a maximum fan speed feature 808. Again, however, the features specifically illustrated in FIG. 8 are exemplary and other implementations may associate more, fewer, and/or different features with the system motion state. Similarly, the configuration functions associated with the motion state may include a voice control function 822, a speed alter function 824, a power save function 826, and a quiet mode function 828.

Figure 9:
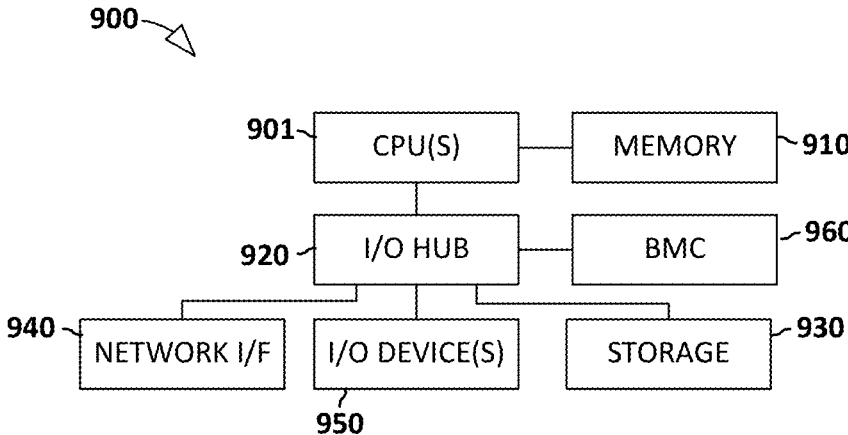
FIG. 9 illustrates an exemplary information handling system suitable for use in conjunction with the subject matter disclosed in FIGS. 1 through 8.

Referring now to FIG. 9, any one or more of the elements illustrated in FIG. 1 through FIG. 8 may be implemented as or within an information handling system exemplified by the information handling system 900 illustrated in FIG. 9. The illustrated information handling system includes one or more general purpose processors or central processing units (CPUs) 901 communicatively coupled to a memory resource 910 and to an input/output hub 920 to which various I/O resources and/or components are communicatively coupled. The I/O resources explicitly depicted in FIG. 9 include a network interface 940, commonly referred to as a NIC (network interface card) , storage resources 930, and additional I/O devices, components, or resources 950 including as non-limiting examples, keyboards, mice, displays, printers, speakers, microphones, etc. The illustrated information handling system 900 includes a baseboard management controller (BMC) 960 providing, among other features and services, an out-of-band management resource which may be coupled to a management server (not depicted). In at least some embodiments, BMC 960 may manage information handling system 900 even when information handling system 900 is powered off or powered to a standby state. BMC 960 may include a processor, memory, an out-of-band network interface separate from and physically isolated from an in-band network interface of information handling system 900, and/or other embedded information handling resources. In certain embodiments, BMC 960 may include or may be an integral part of a remote access controller (e.g., a Dell Remote Access Controller or Integrated Dell Remote Access Controller) or a chassis management controller.

Any one or more of the motion states may be associated with a particular setting or feature of each component control element 801 and each configuration function 820. Thus, for example, the MV motion state may be associated with a particular setting of a particular audio component 804, a particular setting of display brightness 806 and so forth. Conversely each component control feature 801 may have a particular setting associated with one or more of the motion states. Thus, for example, the display brightness 806 may, for example, have a predetermined setting for the MV motion state and the stationary motion state. Associating one or more of the motion states with a corresponding set of predefined component setting and configuration functions may beneficially improve the efficiency of transitioning the system from, for example, an MV motion state configuration to a stationary motion state.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for dynamically configuring an information handling system, the method comprising:

receiving motion data from a plurality of system sensors including at least a global positioning system (GPS) receiver and an accelerometer;

repeatedly identifying a current motion state of the system based on the motion data, wherein the current motion state is selected from a group of motion states including, at least: a moving vehicle (MV) motion state, indicating the system is located within a moving vehicle, and a stationary motion state, indicating the system is stationary or substantially stationary; and tuning a configuration of the system in accordance with the current motion state, wherein said tuning includes, at least, configuring the system in accordance with a safe driving configuration responsive to identifying the MV motion state as the current motion state, wherein the safe driving configuration includes, at least, a fully dimmed or partially dimmed display and a voice control feature enabled;

wherein identifying the current motion state includes:

determining a GPS suitability indicative of whether utilizing GPS data to determine the current motion state is consistent with one or more GPS suitability criteria, wherein the GPS suitability criteria include:

an availability condition indicative of a current availability of GPS data; and a power condition indicative of sufficient power to sustain GPS receiver operation responsive to determining a positive GPS suitability, determining the motion state based on the GPS data; and responsive to determining a negative GPS suitability, determining the current motion state based on data, including the accelerometer data, other than the GPS data.

2. The method of claim 1, wherein determining the current motion state based on data other than GPS data includes invoking a motion state algorithm trained to identify motion states based on acceleration parameters derived from motion data received from the accelerometer.

3. The method of claim 2, wherein the accelerometer parameters include, at least:

x, y, and z components of a mean acceleration parameter;

x, y, and z components of an acceleration variance parameter; and a standard deviation parameter corresponding to a standard deviation of the x, y, and z components of the acceleration variance parameters.

4. The method of claim 3, wherein the MV motion state is identified as the current motion state based, at least in part, on the x, y, and z components of the variance parameter being within a predetermined range.

5. The method of claim 1, wherein the group of motion states includes an other-motion state indicating system motion not associated with a moving vehicle and wherein tuning the configuration of the system comprises maintaining a current configuration of the system responsive to identifying the other-motion state as the current motion state.

6. The method of claim 1, wherein the system comprises a rugged system removably mounted within a motor vehicle.

7. The method of claim 1, wherein repeatedly determining the current motion state comprises determining the current motion state at a frequency exceeding approximately 0.2 Hz.

8. The method of claim 1, wherein the current motion state is determined based on motion data generated during the previous N seconds of time, wherein N is less than or equal to five.

9. The method of claim 1, wherein said tuning includes configuring the system in accordance with a normal configuration responsive to identifying the stationary motion state as the current motion state, wherein the normal configuration includes, at least, an undimmed display and an enabled voice control feature.

10. The method of claim 1, wherein the group of motion states includes an other-motion state indicating system motion not associated with a moving vehicle and wherein tuning the configuration of the system comprises maintaining a current configuration of the system responsive to identifying the other-motion state as the current motion state.

11. An information handling system, comprising:

a central processing unit (CPU); and a memory, accessible to the CPU, including processor executable instructions that, when executed by the CPU, cause the system to perform dynamic configuration tuning operations comprising:

receiving motion data from a plurality of system sensors including at least a global positioning system (GPS) receiver and an accelerometer;

repeatedly identifying a current motion state of the system based on the motion data, wherein the current motion state is selected from a group of motion states including, at least: a moving vehicle (MV) motion state, indicating the system is located within a moving vehicle, and a stationary motion state, indicating the system is stationary or substantially stationary; and tuning a configuration of the system in accordance with the current motion state, wherein said tuning includes, at least, configuring the system in accordance with a safe driving configuration responsive to identifying the MV motion state as the current motion state, wherein the safe driving configuration includes, at least, a fully dimmed or partially dimmed display and an voice control feature enabled, wherein identifying the current motion state includes:

determining a GPS suitability indicative of whether utilizing GPS data to determine the current motion state is consistent with one or more GPS suitability criteria, wherein the GPS suitability criteria include:

an availability condition indicative of a current availability of GPS data; and a power condition indicative of sufficient power to sustain GPS receiver operation responsive to determining a positive GPS suitability, determining the motion state based on the GPS data; and responsive to determining a negative GPS suitability, determining the current motion state based on data, including the accelerometer data, other than the GPS data.

12. The information handling system of claim 11, wherein determining the current motion state based on data other than GPS data includes invoking a motion state algorithm trained to identify motion states based on acceleration parameters derived from motion data received from the accelerometer.

13. The information handling system of claim 12, wherein the accelerometer parameters include, at least:

x, y, and z components of a mean acceleration parameter;

x, y, and z components of an acceleration variance parameter; and a standard deviation parameter corresponding to a standard deviation of the x, y, and z components of the acceleration variance parameters.

14. The information handling system of claim 13, wherein the MV motion state is identified as the current motion state based, at least in part, on the x, y, and z components of the variance parameter being within a predetermined range.

15. The information handling system of claim 11, wherein the system comprises a rugged system removably mounted within a motor vehicle.

16. The information handling system of claim 11, wherein repeatedly determining the current motion state comprises determining the current motion state at a frequency exceeding approximately 0.2 Hz and wherein the current motion state is determined based on motion data generated during the previous N seconds of time, wherein N is less than or equal to five.

* * * * *